(12) United States Patent
Hobson

(10) Patent No.: US 8,741,133 B2
(45) Date of Patent: *Jun. 3, 2014

(54) APPRATUS FOR HYDROCARBON REMOVAL

(75) Inventor: Mark Thomas Hobson, Chagrin Falls, OH (US)

(73) Assignee: Abanaki Corporation, Chagrin Falls, OH (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/652,724

(22) Filed: Jan. 5, 2010

(65) Prior Publication Data

US 2010/0170844 A1 Jul. 8, 2010

Related U.S. Application Data

(60) Provisional application No. 61/204,280, filed on Jan. 5, 2009.

(51) Int. Cl.
*E02B 15/10* (2006.01)
*B01D 17/022* (2006.01)
*B01D 17/02* (2006.01)
C02F 101/32 (2006.01)
C02F 103/00 (2006.01)
B01J 20/28 (2006.01)

(52) U.S. Cl.
CPC .............. *E02B 15/102* (2013.01); *E02B 15/103* (2013.01); *C02F 2101/32* (2013.01); *C02F 2103/007* (2013.01); *B01D 17/0202* (2013.01); B01J 20/28023 (2013.01); *B01J 20/2804* (2013.01); Y10S 210/924 (2013.01)
USPC .................. 210/170.11; 210/242.4; 210/523; 210/924

(58) Field of Classification Search
USPC ......... 210/170.09, 170.11, 242.3, 242.4, 523, 210/526, 776, 923, 924
See application file for complete search history.

(56) References Cited

U.S. PATENT DOCUMENTS

| | | | | |
|---|---|---|---|---|
| 3,617,555 A | * | 11/1971 | Ginsburgh et al. | 210/242.4 |
| 3,617,556 A | * | 11/1971 | Cole et al. | 210/242.4 |
| 3,968,041 A | * | 7/1976 | De Voss | 210/242.3 |
| 4,264,450 A | * | 4/1981 | Ayers et al. | 210/242.4 |
| 4,473,469 A | * | 9/1984 | Ayroldi | 210/242.3 |
| 4,834,880 A | * | 5/1989 | Lundin | 210/242.3 |
| 5,043,064 A | * | 8/1991 | Abell et al. | 210/242.3 |
| 5,085,770 A | * | 2/1992 | Eberhardt | 210/242.3 |
| 5,137,630 A | * | 8/1992 | Eklund | 210/242.3 |
| 5,685,979 A | * | 11/1997 | Governale | 210/242.3 |
| 5,902,664 A | * | 5/1999 | Gurfinkel | 210/242.4 |
| 6,372,134 B1 | * | 4/2002 | Larsen | 210/242.3 |
| 7,303,688 B2 | * | 12/2007 | Pertile et al. | 210/923 |
| 8,388,839 B1 | * | 3/2013 | Hobson et al. | 210/242.4 |

* cited by examiner

*Primary Examiner* — Christopher Upton

(74) *Attorney, Agent, or Firm* — Benesch, Friedlander, Coplan & Aronoff, LLP

(57) ABSTRACT

A hydrocarbon removal apparatus includes a plurality of fibers and a backing substrate. Each of the plurality of fibers includes a proximal end and a distal end. Each proximal end is secured to the backing substrate.

17 Claims, 5 Drawing Sheets

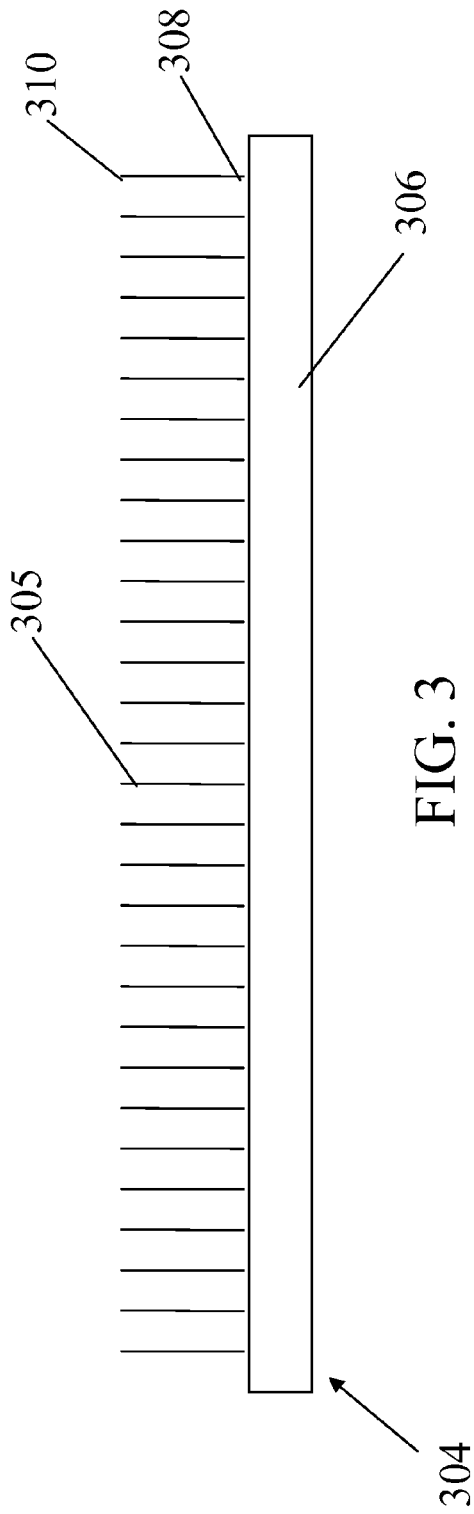
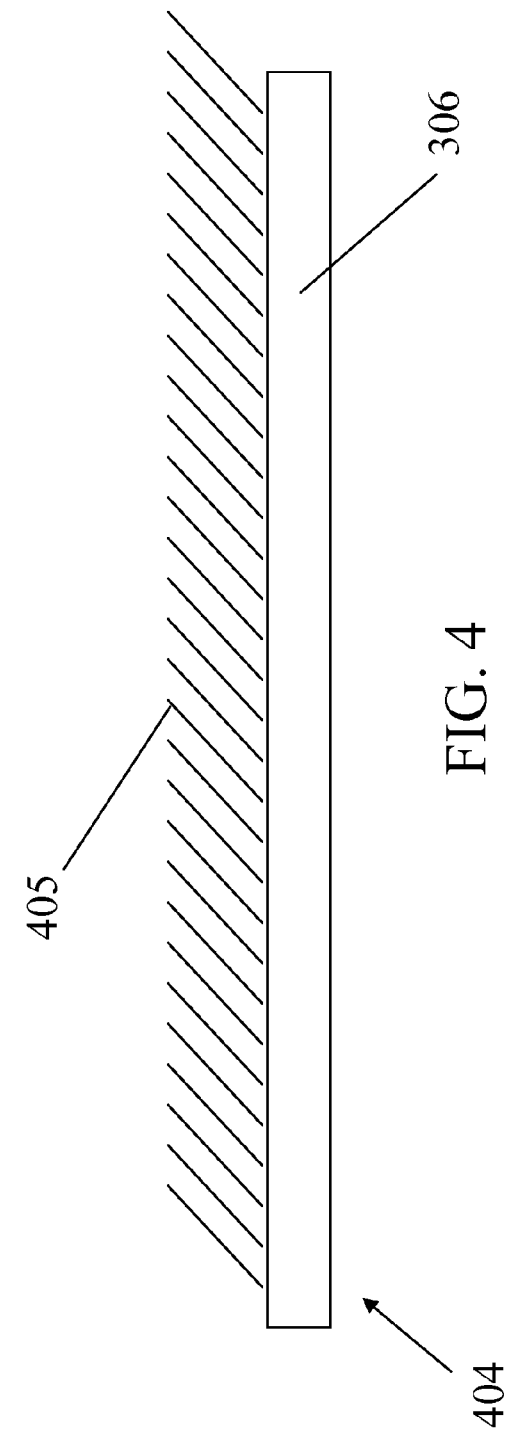

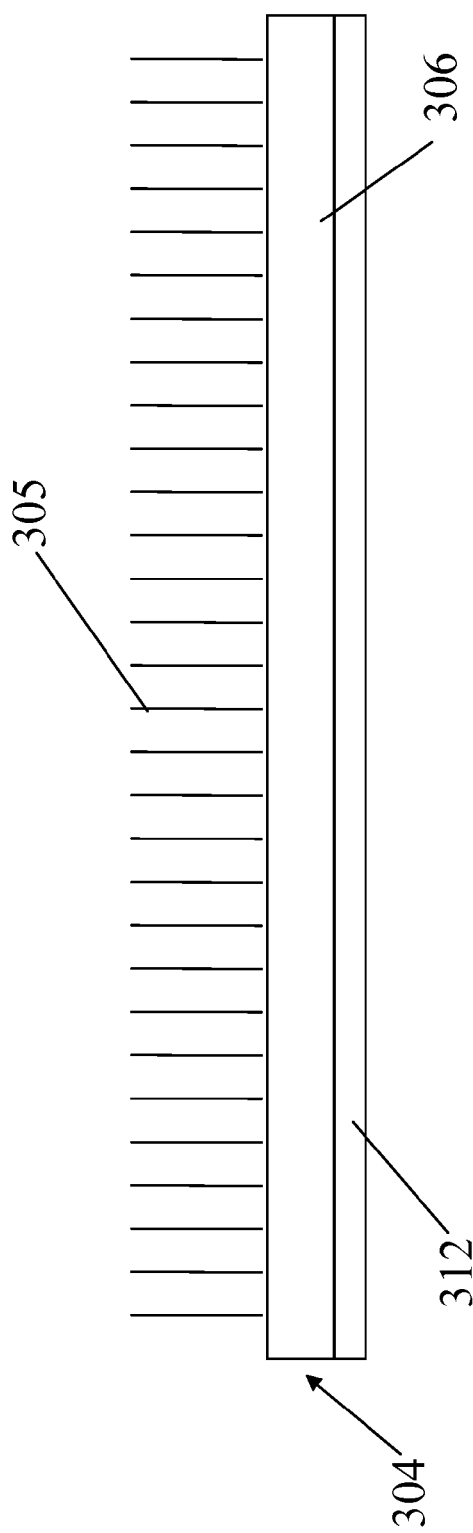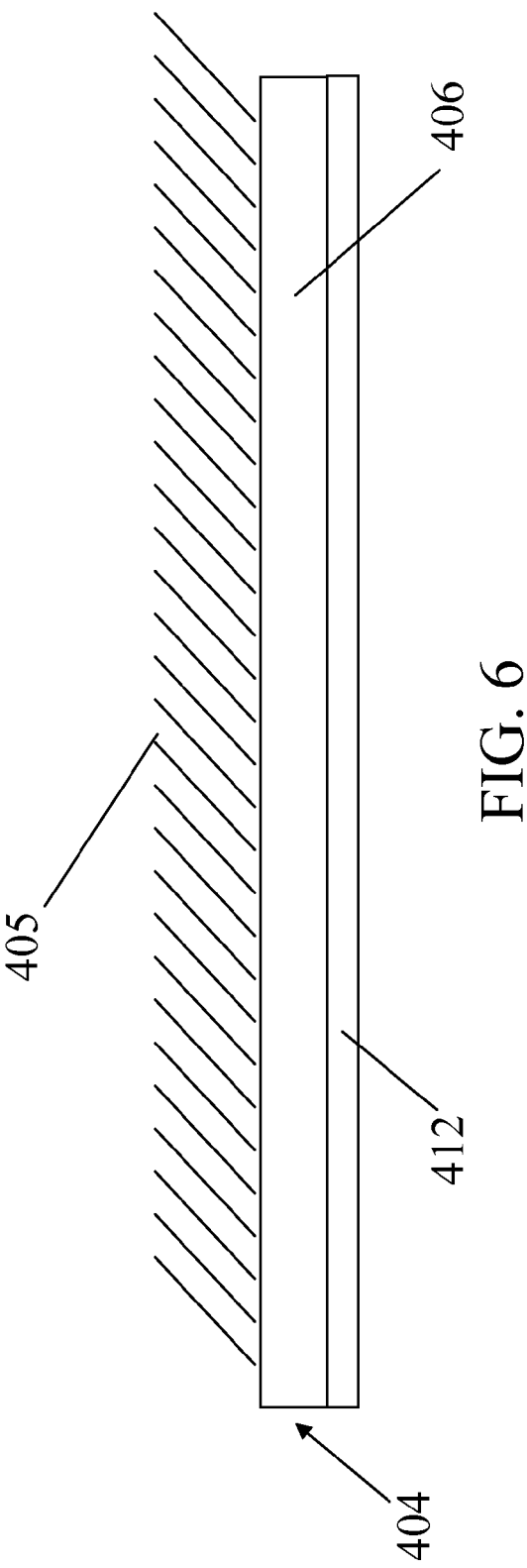

APPRATUS FOR HYDROCARBON REMOVAL

CROSS REFERENCE TO RELATED APPLICATION

This application claims the priority benefit of U.S. Provisional Patent Application Ser. No. 61/204,280, titled "Materials and Methods for Hydrocarbon Removal," and filed on Jan. 5, 2009, which is expressly incorporated by reference herein in its entirety.

TECHNICAL FIELD

This disclosure generally relates to arrangements of apparatuses and methods for removing hydrocarbons from bodies of water, and in particular, this disclosure relates to removing low-viscosity hydrocarbons such as, for example, gasoline, diesel fuel, and crude oil from bodies of water.

BACKGROUND

Hydrocarbons such as gasoline, diesel fuel, crude oil, and other such petroleum products are often either unintentionally or intentionally deposited into bodies of water. For example, petroleum-based fuels for large and small boats and ships may leak or spill into rivers, lakes, or oceans due to accidents or simple mechanical failures. For example, an accident or mechanical failure involving a bulk oil tanker can result in relatively large amounts of crude oil being quickly spilled into oceans, harbors, or other seaways.

Certain manufacturing processes intentionally mingle water and petroleum products. For example, a petroleum product, such as lubrication oil, may be used to cool and/or lubricate moving parts during the manufacturing of commercial and industrial articles and components. Such processes may result in the petroleum products being deposited in rivers, lakes, large retaining ponds, or reservoirs.

In these and similar examples, petroleum products can separate from the water and migrate to the surface of the body of water, producing an oil slick resting on top of the body of water. Such oil slicks can result in environmental damage, such as harming flora and fauna, and/or result in the formation of hazards, such as providing conditions that can result in the ignition and burning of a fire on the surface of the body of water.

SUMMARY

In accordance with one embodiment, a hydrocarbon removal apparatus for removing hydrocarbons from a body of water includes a rotating member and a fiber mat. The rotating member includes an engagement surface and is arranged to selectively rotate through a body of water. The fiber mat is arranged to be removeably securable to the engagement surface. The fiber mat includes a backing substrate and a plurality of fibers. Each of the plurality of fibers includes a proximal end and a distal end, wherein each proximal end is secured to the backing substrate.

In accordance with another embodiment, a hydrocarbon removal apparatus for removing hydrocarbons from a body of water includes a rotating member, a plurality of fibers, a motor, and a wiper mechanism. Each of the plurality of fibers includes a proximal end and a distal end, wherein each proximal end is secured to the rotating member. The motor is in driving engagement with the rotating member, and the wiper mechanism is configured for selective engagement with the plurality of fibers.

In accordance with another embodiment, a hydrocarbon removal apparatus includes a jacket and a plurality of fibers. The jacket includes an inner surface and an outer surface. The inner surface defining a cavity configured to receive a human hand. Each of the plurality of fibers includes a proximal end and a distal end, wherein each proximal end is secured to the outer surface of the jacket.

BRIEF DESCRIPTION OF DRAWINGS

While the specification concludes with claims particularly pointing out and distinctly claiming the present invention, it is believed that the same will be better understood from the following description taken in conjunction with the accompanying drawings in which:

FIG. 3 is a schematic view depicting a fiber mat with fibers extending generally at a 90 degree angle from a backing of the fiber mat for use with hydrocarbon removal apparatus such as those illustrated in FIGS. 1 and 2;

FIG. 4 is a schematic view depicting a fiber mat with fibers extending generally at a 45 degree angle from a backing of the fiber mat for use with hydrocarbon removal apparatus such as those illustrated in FIGS. 1 and 2;

FIG. 5 is a schematic view depicting the fiber mat of FIG. 3 with a coating applied to the backing;

FIG. 6 is a schematic view depicting the fiber mat of FIG. 4 with a coating applied to the backing.

DETAILED DESCRIPTION

Figure 1:
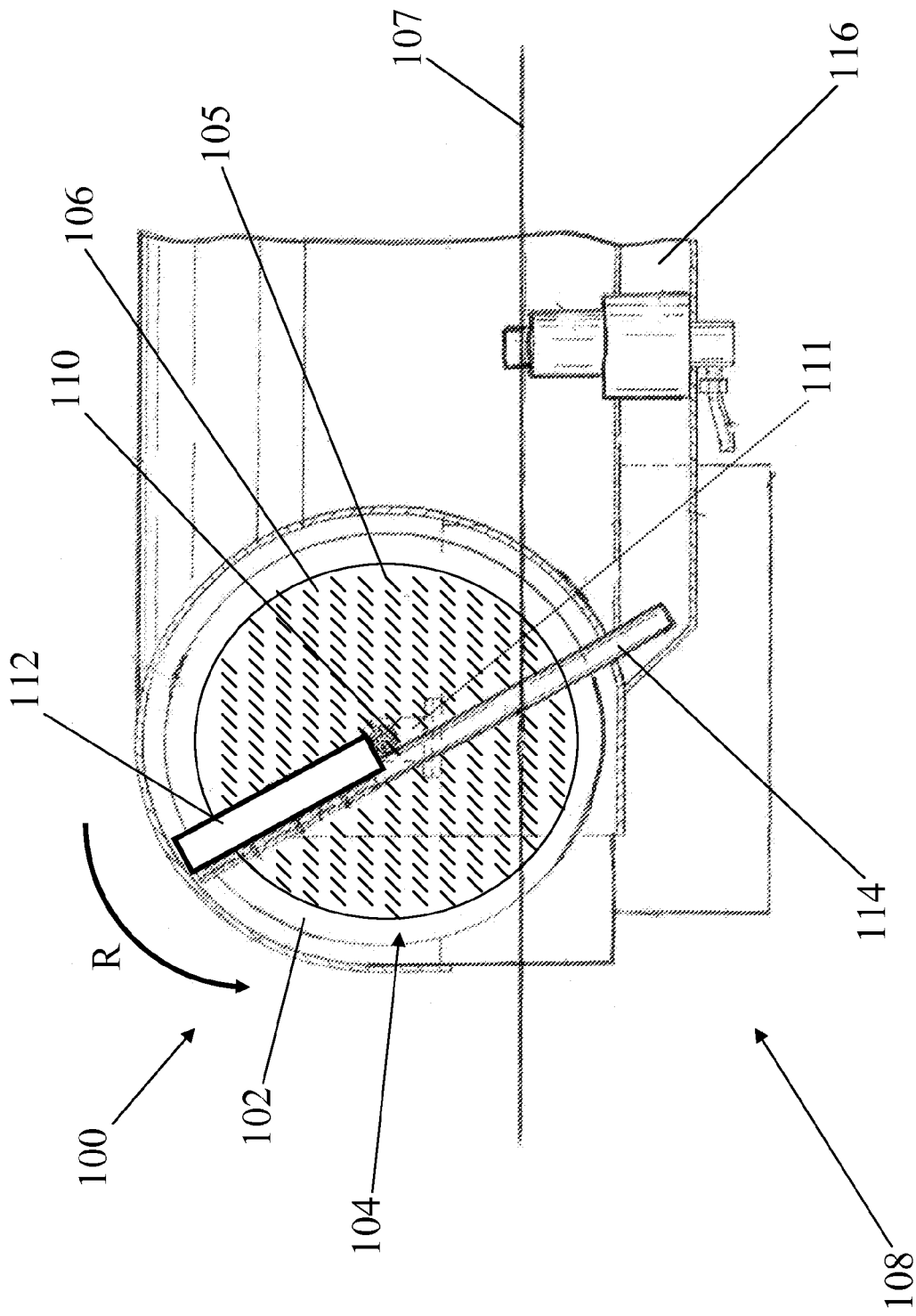
FIG. 1 is a side elevation view, partially in cross-section, depicting a hydrocarbon removal apparatus having a disk-shaped removal member and a disk-shaped fiber mat secured to the disk-shaped removal member in accordance with one embodiment.

The apparatuses, materials, and methods disclosed in this document are described in detail by way of examples and with reference to FIGS. 1-7. Unless otherwise specified, like numbers in FIGS. 1-7 indicate references to the same, similar, or corresponding elements throughout FIGS. 1-7. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses, materials, and methods for removing hydrocarbons from a body of water are hereinafter disclosed and described in detail with reference made to FIGS. 1-7.

This present disclosure is directed to apparatuses, materials, and methods for removing hydrocarbons, such as petroleum products, from bodies of water or from objects that come into contact with bodies of water. For example, described herein are examples of fiber mats that can be used with a hydrocarbon removal apparatus, such as an oil skimmer apparatus, for removing hydrocarbons from bodies of water. In one example, a fiber mat can be placed into a body of water to engage hydrocarbons so that the hydrocarbons adhere to or otherwise attach to the fiber mat. The fiber mat can then be removed from the body of water along with the hydrocarbons adhering to the fiber mat. The hydrocarbons can subsequently be removed from the fiber mat by, for example, a wiping process. This process can then be repeated, with the fiber mat again being placed into the body or water to engage hydrocarbons and further remove hydrocarbons from the body of water.

It will thus be understood that hydrocarbon removal apparatuses can include mechanisms for repeatedly passing fiber mats through or along the surface of bodies of water to remove petroleum and other such hydrocarbon products from the surface of the bodies of water. Such fiber mats can be mounted on, for example, disks, drums, or belts to provide for repeatedly passing the fiber mat through the surface of a body of water. Once the fiber mat has been passed through the surface of the body of water to pickup hydrocarbons, the fiber mat can be wiped or otherwise engaged to remove the collected hydrocarbons from the fiber mat prior to the fiber mat again being passed through the surface of the body of water to further remove hydrocarbons.

As will be subsequently described in detail, a plurality of fibers can be arranged to generally extend from a backing to form a fiber mat. The fibers can be secured to the backing by methods such as tufting and flocking. The fibers can extend from the backing at a variety of suitable angles such as, for example, approximately 90 degrees with respect to the backing or approximately 45 degrees with respect to the backing. Such a fiber mat can be removeably attached to a removal member such as a disk, drum, or belt of a hydrocarbon removal apparatus for use in removing hydrocarbons from bodies of water.

In another example, the fiber mat can be fabricated such that the fiber mat itself serves as a removal member such as a disk, drum, or belt for removable attachment to a hydrocarbon removal apparatus. In this configuration, the backing of the fiber mat can be arranged to have sufficient stiffness or structural integrity to maintain the necessary shape and/or configuration to operate as a disk, drum, or belt shaped removal member. In another example, the backing can be reinforced with a support layer to enhance the structural integrity of the fiber mat. For example, a urethane layer can be painted on, applied to, or otherwise coated onto the backing of the fiber mat to improve the structural integrity of the fiber mat material.

In another example, the fiber mat can be arranged as an article or other such apparatus for use in manually removing hydrocarbons such as petroleum products from objects coated with hydrocarbons. For example, the fiber mat can be arranged into the shape of a glove that can be slid onto a hand of a worker so that the worker can manually wipe down objects coated with hydrocarbons. While wiping down objects, the fiber mat can engage hydrocarbons so that the hydrocarbons adhere to the fiber mat and are removed from the object. Once a worker uses the fiber mat to wipe down surfaces covered with hydrocarbons, the fiber mat can be engaged with a wiper apparatus to remove the hydrocarbons from the fiber mat so that the fiber mat can be repeatedly used to wipe down objects coated with hydrocarbons. For example, once the fiber mat has engaged the hydrocarbons, a worker can wipe the fiber mat along a bar that is arranged to span the opening of a container. The engagement of the fiber mat and the bar can remove the hydrocarbons from the fiber mat, and the removed hydrocarbons can be deposited into the container.

FIG. 1 illustrates a hydrocarbon removal apparatus, or more particularly, a skimmer apparatus 100. The skimmer apparatus 100 can include a disk-shaped removal member 102 and a fiber mat 104 removeably secured to the disk-shaped removal member 102. The fiber mat 104 can include a plurality of individual fibers 105 extending outwardly from a backing 106 of the fiber mat 104. These fibers 105 can be arranged so that hydrocarbons such as petroleum products can be attracted to or otherwise adhere to the fibers 105 upon engagement with the fibers 105. The fiber mat 104 can be disk-shaped to generally correspond with the shape of the disk-shaped removal member 102. The disk-shaped removal member 102 can be arranged to rotate so that rotation of the disk-shaped removal member 102 also rotates the fiber mat 104.

The skimmer apparatus 100 can be positioned such that a portion of the skimmer apparatus 100 is positioned below a surface 107 of a body of water 108. The skimmer apparatus 100 can further include a shaft member 110 arranged generally parallel to the surface 107 of the body of water 108. The disk-shaped removal member 102 can be mounted onto the shaft 110 so that the disk-shaped removal member 102 generally rotates in a plane perpendicular to the surface 107 of the body of water 108. During such rotation, a portion of the disk-shaped removal member 102, and thus a portion of the fiber mat 104, can be submerged in the body of water 108. A motor 111 can be coupled to the shaft 110 to facilitate rotation of the shaft 110 and disk-shaped removal member 102.

The skimmer apparatus 100 illustrated in FIG. 1 can provide for the fiber mat 104 to pass through the surface 107 of the body of water 108 so that the fibers 105 of the fiber mat 104 engage hydrocarbons on the surface 107 of the body of water 108. As a portion of the fiber mat 104 engages the hydrocarbons during rotation of the fiber mat 104, the hydrocarbons can adhere to the fibers 105 of the fiber mat 104 and travel along with the rotating fiber mat 104. Once the fiber mat 104 passes through the surface 107 of the body of water 108, the fiber mat 104 can continue to travel in a circular path R until it exits the body of water 108. After exiting the body of water 108, the fiber mat 104 can engage a wiper mechanism 112 coupled to the skimmer apparatus 100. The wiper mechanism 112 can be arranged to remove hydrocarbons adhered to the fibers 105 of the fiber mat 104 upon engagement with the fiber mat 104. The fiber mat 104 can then continue to rotate and re-enter the body of water 108 to repeat the cycle and further remove hydrocarbons from the body of water 108. As the wiper mechanism 112 removes hydrocarbons from the fibers 105 of the fiber mat 104, the removed hydrocarbons can be channeled into a conduit 114 or other such pathway and be deposited into a reservoir 116 for segregation and proper disposition of the hydrocarbons.

Figure 2:
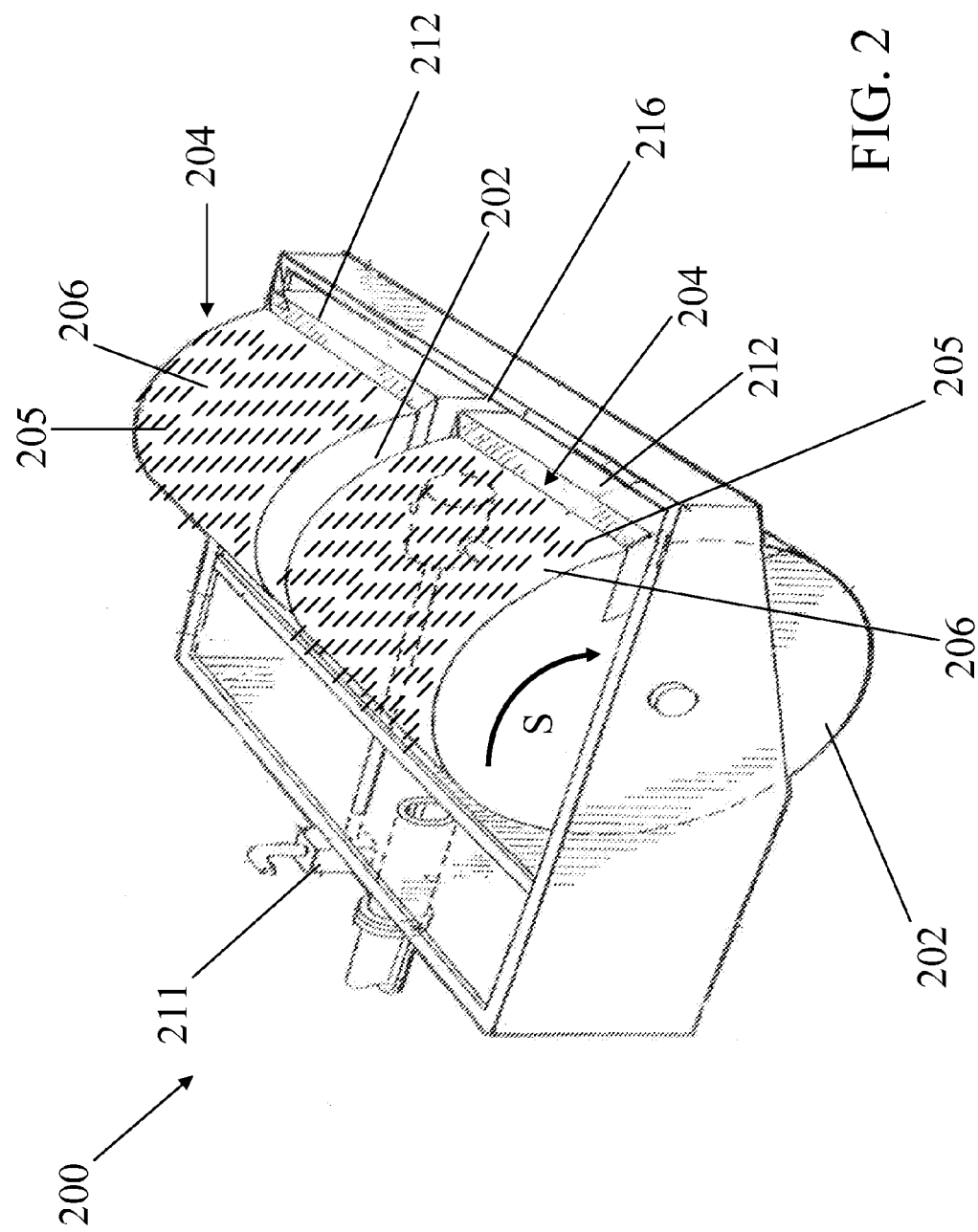
FIG. 2 is a perspective view depicting a hydrocarbon removal apparatus in accordance with another embodiment, wherein the apparatus includes a pair of drum-shaped removal members and a respective rectangular fiber mat secured to each of the drum-shaped removal members.

FIG. 2 illustrates another example of a skimmer apparatus 200 that includes a pair of drum-shaped removal members 202 and a pair of fiber mats 204 removeably secured to the drum-shaped removal members 202. The fiber mats 204 each can include a plurality of individual fibers 205 extending outwardly from a backing 206 of the fiber mats 204 and arranged to remove hydrocarbons from bodies of water. A portion of each drum-shaped removal member 202 can be submerged below a surface of a body of water. The skimmer apparatus 200 can include a motor 211 that can be mechanically configured to rotate the drum-shaped removal members 202 through the body of water and along a circular path S. As will be readily understood, such an arrangement provides for the fiber mats 204 to pass through the surface of the body of water to engage fibers 205 with hydrocarbons on the surface of the body of water. Once the fibers 205 engage the hydrocarbons, the fiber mats 204 can continue to travel in the circular path S and exit the body of water. After exiting the body of water, the fiber mats 204 can be engaged by a pair of wiper mechanisms 212 to remove the hydrocarbons from the fibers 205. The fiber mats 204 can then continue to rotate back into the body of water to further remove hydrocarbons from the body of water. As hydrocarbons are removed from the fibers 205 by the wiper mechanisms 208, the removed hydrocarbons can be collected in a reservoir 216 for segregation and proper disposition of the hydrocarbons.

The fiber mats 204 illustrated in FIG. 2 can be configured to be rectangular mats. In such a configuration, a respective one of the fiber mats 204 can be wrapped around each of the cylindrical drum-shaped removal members 202, with a leading edge of the rectangular fiber mat 204 meeting and being secured to the trailing edge of the rectangular fiber mat 204 to at least partially secure the fiber mat 204 to the drum-shaped removal member 202. In another example, at least a portion of a drum-shaped removal member can be fabricated from fiber mat material. It will be understood that when the drum-shaped removal member is at least partially fabricated from fiber mat material, the drum-shaped removal member can function generally as described above.

The selection and arrangement of the plurality of fibers of a fiber mat can result in efficient removal of hydrocarbons from bodies of water. An example of a fiber mat 304 is illustrated in FIG. 3. The fiber mat 304 is shown to include a backing 306 and a plurality of fibers 305 secured to and extending from the backing 306. As shown, the fibers 305 generally extend from the backing 306 at an approximately 90 degree angle to the backing 306. It will be understood that the backing 306 can operate as a substrate to support the fibers 305. The fibers 305 can be arranged such that a proximal end 308 of each fiber 305 is secured to the backing 306, and a distal end 310 of each fiber 305 is generally free and unencumbered.

The plurality of fibers 305 can be arranged so that when used with a hydrocarbon removal apparatus, a relatively large collective surface area of the plurality of fibers 305 engages with hydrocarbons on a surface of a body of water. Such an arrangement will generally increase the amount of hydrocarbons removed from the body of water as the fiber mat 304 passes through the body of water. In one example, the collective surface area of the plurality of fibers 305 is generally increased by densely packing the fibers 305 onto the backing 306. Such an arrangement can provide for more fibers 305 engaging with hydrocarbons on the surface of the body of water and, thus, can provide for a greater collective surface area of those fibers 305 engaging with the hydrocarbons. In another example, the collective surface area of the plurality of fibers 305 that engages with hydrocarbons on the surface of a body of water can be increased by increasing the average length of the plurality of fibers 305. Such an arrangement can also increase the surface area of the body of water that is covered by the fiber mat 304 each time the fiber mat 304 is passed through the surface of the body of water.

In another example, as shown in FIG. 4, a fiber mat 404 can be arranged such that the plurality of fibers 405 generally extends from a backing 406 at an angle other than approximately 90 degrees. Such an arrangement can facilitate effective wiping of the fiber mat 400 by a wiper mechanism. In such an arrangement, the plurality of fibers 405 can be generally angled away from the direction of travel of the fiber mat 404. In one example, as shown in FIG. 4, the plurality of fibers 405 can generally extend from the backing 406 at an angle of approximately 45 degrees. In other examples, the plurality of fibers 405 can generally extend from the backing 406 at an angle that is greater than or less than approximately 45 degrees. In yet another example, different sections or portions of the plurality of fibers 405 can generally extend from the backing 406 at different angles.

In one example, each of a plurality of densely packed fibers can be at least one-eighth inch in length. Such an arrangement can be effective in picking up hydrocarbons, particularly thin, low viscosity petroleum products such as gasoline, diesel, and crude oil, from a body of water. In other examples, the densely packed fibers can be substantially longer than one-eighth inch. For example, individual fibers can exceed two inches in length or can exceed three inches in length. The fibers can also be arranged such that the lengths of the fibers are not generally uniform. For example, a number of the fibers of the fiber mat can be generally one-eighth inch in length, while other fibers of the fiber mat can be substantially longer or shorter. Fiber mats with such arrangements of fibers can be retrofitted for use with existing skimmer apparatuses to improve the performance of such skimmer apparatuses. Fiber mats can be suitably arranged to be secured to and selectively removable from removal members for use with skimmer apparatuses. For example, the fiber mat can be removably or reversibly attached or secured to a removal member by sewing the fiber mat around a disk-shaped removal member, a drum-shaped removal member, or other suitable removal member of a skimmer apparatus.

In other examples, a fiber mat can be attached or secured by a reversible mechanism such as Velcro®, snaps, buttons, straps, tabs, adhesives, and/or the like. In yet another example, a fiber mat can be glued to or otherwise adhered to an existing hydrocarbon-gathering surface of a skimmer apparatus. Conventional wiper mechanisms can be used to wipe hydrocarbons from the fibers of a fiber mat. Such an arrangement can further facilitate the use of a fiber mat with existing disk, drum, or belt skimmers by allowing for the use of the original wiper mechanisms and methods without any need for substantial modification of the existing skimmers apparatus.

Examples of methods or processes that can be used to secure fibers to the backing of a fiber mat include tufting and flocking processes. An example of a tufting method includes a stitching process by which fibers are stitched to the backing of the fiber mat by passing a portion of the fiber through the backing. An example of a flocking method includes an adhering process where fibers or groups of fibers are adhered to the backing using glue or other such adhesives. Either process can form a dense pile of fibers extending from the backing to facilitate effective removal of petroleum products from a body of water.

The fibers and the backing of fiber mats can both be fabricated from an oleophilic and/or hydrophobic material. Examples of such oleophilic and hydrophobic materials include nylon and polyethylene terephthalate (PET). In one example, the fibers can be fabricated from nylon and the backing can be fabricated from PET. The thickness of the backing can vary to accommodate any number of suitable applications. For example, if the fiber mat is to be used to retrofit a skimmer with a belt mechanism, a thickness for the backing can be between about 0.030 inches and about 0.050 inches. In another example, if the fiber mat is to be used to retrofit a skimmer with a disk or drum mechanism, a thickness for the backing can be between about 0.010 inches and about 0.040 inches. In other examples, the backing can be thicker or thinner depending on any requirements for a particular skimmer apparatus.

As previously described, the length of the fibers can influence the capacity of the fiber mat to remove petroleum or other hydrocarbons from a body of water. Generally, longer fibers can increase the capacity for removing hydrocarbons. In one example, the length of the fibers can be substantially greater than approximately one-eighth inch. In addition to being fabricated from a hydrophobic material, the backing can also be fabricated to generally resist stretching and remain transversely flat during operation.

The fiber mat can undergo additional fabrication steps to arrange the properties of the fiber mat for different applications. For example, as seen in FIGS. 5 and 6, an additional or support layer 312, 412 can be bonded to the backing 306, 406 of fiber mats 304, 404 to stiffen the backing 306, 406. In addition to stiffening the backing 306, 406, the support layer 312, 412 can enhance the ability of the fiber mat 304, 404 to resist stretching or other such physical distortions during operation. In one example, the support layer 312, 412 is a urethane layer bonded to the backing 306, 406. In another example, the backing 306, 406 can be sprayed, painted, or otherwise coated with urethane to form the support layer 312, 412. It will be understood that any of a variety of suitable materials can be applied as additional or alternative layers or coatings to a backing of a fiber mat to enhance the properties of the fiber mat. In addition, any of a variety of methods can be employed to apply such layers or coatings.

In one example, fiber mats were tested that comprise a plurality of approximately 0.18 inch long nylon fibers flocked to a backing such that the density of the fibers is approximately 18 denier. The nylon fibers tested were a semi-dull nylon type. The backing used for the testing was a Eurotech® brand thermoplastic material supplied by Mol Belting Company of Waldorf Court, Grand Rapids, Mich. The flocked nylon fiber mats were retrofitting onto existing skimmer apparatuses and tested for removing both crude oil and gasoline from bodies of water. When compared to the hydrocarbon removal capabilities of prior art removal media used with the existing skimmer apparatuses, use of the flocked nylon fiber mats increased the removal of crude oil from a body of water by a factor of at least three. For such flocked nylon fiber mats, testing for removal of gasoline from a body of water resulted in an improvement of approximately an order of magnitude over prior art removal media used with the existing skimmer apparatuses.

Figure 7:
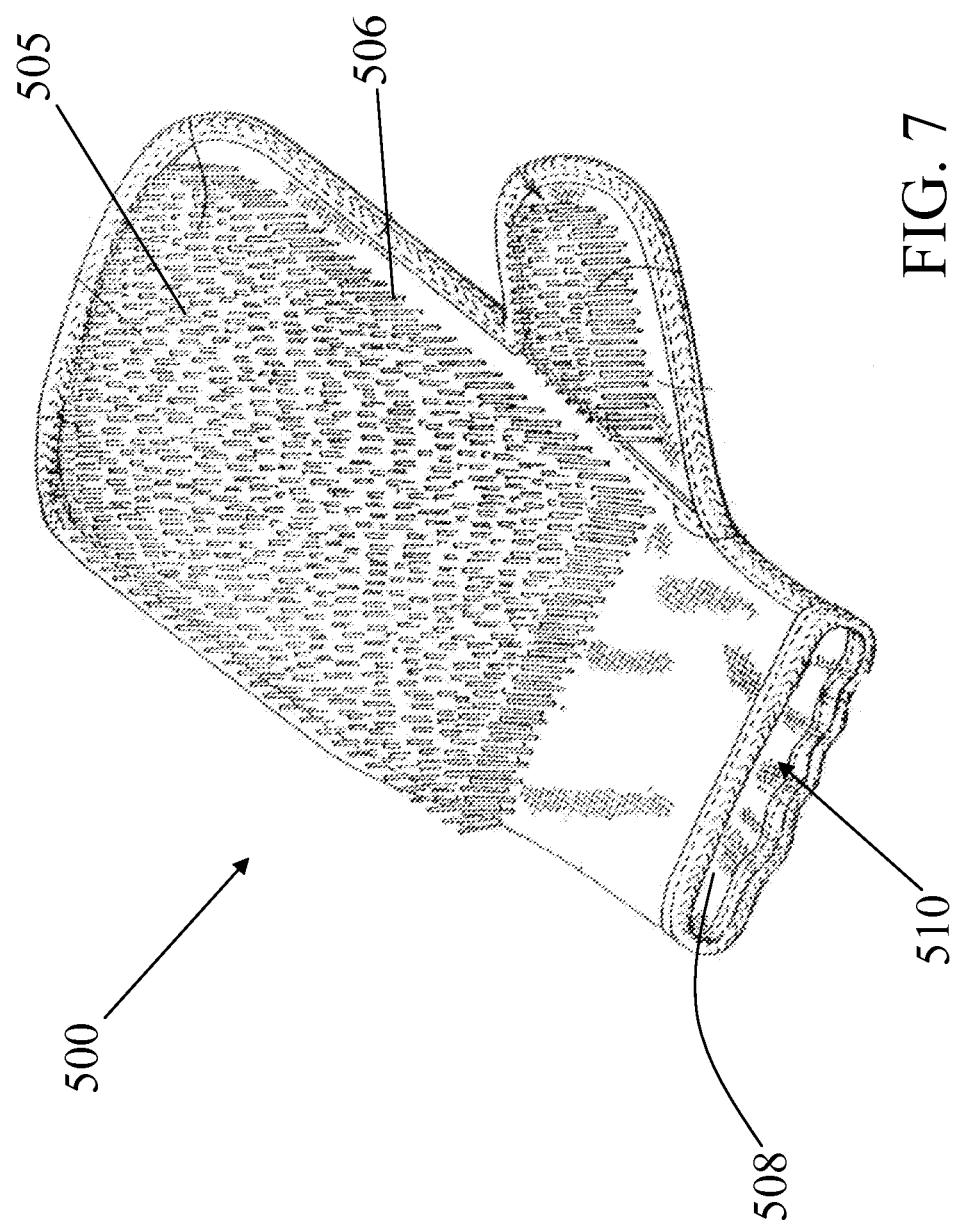
FIG. 7 is a perspective view of a hydrocarbon removal apparatus in accordance with another embodiment, wherein the apparatus includes a jacket configuration.

As seen in FIG. 7, a hydrocarbon removal apparatus 500 can be arranged as a glove or mitten and configured for manually removing spilled or leaked hydrocarbons adhered to or coating objects. The hydrocarbon removal apparatus 500 can include an outer surface 506 and an inner surface 508 that defines a cavity 510 configured to receive a human hand. As will be understood, such a cavity 510 can be arranged so that the hydrocarbon removal apparatus 500 can be easily slid onto a clean-up worker's hand. The hydrocarbon removal apparatus 500 can include a plurality of fibers 505 extends from the outer surface 506. As will be understood, fibers 505 can be arranged to extend from one side of the outer surface 506 or extend from both sides of the outer surface 506. The fibers 505 can extend at a generally 90 degree angle from the outer surface 506, as shown in FIG. 7, or the fibers 505 can be arranged at any number of angles to accommodate specific uses or implementations.

The hydrocarbon removal apparatus 500 can also be employed with any number of wiper mechanisms. For example, a single wiper or double wiper can be employed depending on whether the hydrocarbon removal apparatus 500 includes fibers 505 on one side or both sides of the outer surface 506. In another example, a bar can be arranged across the opening of a container serving as a reservoir so that the hydrocarbon removal apparatus 500 can be wiped across the bar and any hydrocarbons wiped off the hydrocarbon removal apparatus 500 fall into the container. In such an example, the container can be a simple bucket. Although the hydrocarbon removal apparatus 500 is described and illustrated herein, it will be understood that a manual hydrocarbon removal apparatus can be arranged in any of a variety of other suitable configurations to remove hydrocarbons from objects.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A hydrocarbon removal apparatus for removing hydrocarbons from a body of water, the hydrocarbon removal apparatus comprising:
    a rotatable disk including an engagement surface and arranged to selectively rotate through a body of water; and
    a disc-shaped fiber mat securable to the engagement surface so that the mat can be removed intact from the engagement surface, the fiber mat comprising:
        a backing substrate; and
        a plurality of fibers, each of the fibers having a proximal end and a distal end, wherein each proximal end is secured to the backing substrate.

2. The hydrocarbon removal apparatus of claim 1, wherein the plurality of fibers extend from the backing substrate at an approximately 90 degree angle with respect to the backing substrate.

3. The hydrocarbon removal apparatus of claim 1, wherein the plurality of fibers extend from the backing substrate at an approximately 45 degree angle with respect to the backing substrate.

4. The hydrocarbon removal apparatus of claim 1, wherein the fiber mat further comprises a support layer secured to the backing substrate.

5. The hydrocarbon removal apparatus of claim 4, wherein the support layer comprises urethane.

6. The hydrocarbon removal apparatus of claim 1, wherein the proximal ends of the plurality of fibers are secured to the backing substrate by a flocking process.

7. The hydrocarbon removal apparatus of claim 6, wherein the proximal ends of the plurality of fibers are secured to the backing substrate at a density of at least approximately 18 denier.

8. The hydrocarbon removal apparatus of claim 1, wherein the proximal ends of the plurality of fibers are secured to the backing substrate by a tufting process.

9. The hydrocarbon removal apparatus of claim 1, wherein the plurality of fibers comprises nylon fibers and the backing substrate comprises polyethylene terephthalate.

10. The hydrocarbon removal apparatus of claim 1, wherein the distal end of each of the plurality of fibers is free and spaced away from the backing substrate.

11. The hydrocarbon removal apparatus of claim 1, further comprising a wiper mechanism configured for selective engagement with the plurality of fibers.

12. The hydrocarbon removal apparatus of claim 1, wherein the plurality of fibers are at least one-eighth inch in length.

13. The hydrocarbon removal apparatus of claim 1, wherein the plurality of fibers are at least two inches in length.

14. The hydrocarbon removal apparatus of claim 1, wherein the plurality of fibers are at least three inches in length.

15. The hydrocarbon removal apparatus of claim 1, wherein the plurality of fibers have non-uniform lengths.

16. The hydrocarbon removal apparatus of claim 1, wherein the backing substrate has a thickness between about 0.010 inches and about 0.040 inches.

17. The hydrocarbon removal apparatus of claim 1, wherein the fiber mat is removably secured by one of hook and loop fasteners, snaps, buttons, straps, tabs, or adhesives.

\* \* \* \* \*